United States Patent
Ereifej et al.

(10) Patent No.: US 9,167,308 B2
(45) Date of Patent: Oct. 20, 2015

(54) INTEGRATED LASER AND MODULATOR TRANSMITTER FOR CATV APPLICATIONS

(71) Applicants: Heider Ereifej, Chalfont, PA (US); John L. Fiorillo, Chalfont, PA (US)

(72) Inventors: Heider Ereifej, Chalfont, PA (US); John L. Fiorillo, Chalfont, PA (US)

(73) Assignee: Finisar Corporation, Horsham, PA (US)

( * ) Notice: Subject to any disclaimer, the term of this patent is extended or adjusted under 35 U.S.C. 154(b) by 253 days.

(21) Appl. No.: 13/970,952

(22) Filed: Aug. 20, 2013

(65) Prior Publication Data

US 2014/0059638 A1    Feb. 27, 2014

Related U.S. Application Data

(60) Provisional application No. 61/692,693, filed on Aug. 23, 2012.

(51) Int. Cl.
| | |
|---|---|
| *H04B 10/00* | (2013.01) |
| *H04B 10/12* | (2006.01) |
| *H04N 21/61* | (2011.01) |
| *H04B 10/2575* | (2013.01) |

(52) U.S. Cl.
CPC ......... *H04N 21/61* (2013.01); *H04B 10/25751* (2013.01); *H04N 21/6118* (2013.01)

(58) Field of Classification Search
CPC .................. H04B 10/25751; H04B 10/25505; H04B 10/25548; H04B 10/25588; H04N 21/61; H04N 21/6118
See application file for complete search history.

(56) References Cited

U.S. PATENT DOCUMENTS

| | | | |
|---|---|---|---|
| 7,359,447 B2 | 4/2008 | Sage | |
| 2005/0254743 A1 | 11/2005 | Akiyama et al. | |
| 2006/0269295 A1 | 11/2006 | Way | |
| 2011/0255878 A1 | 10/2011 | Sage | |

FOREIGN PATENT DOCUMENTS

KR    10-2007-0058223 A    6/2007

OTHER PUBLICATIONS

"Notification of Transmittal of the International Search Report and The Written Opinion of the International Searching Authority, or the Declaration" for PCT/US2013/055702, Nov. 27, 2013, 10 Pages, Korean Intellectual Property Office, Daejeon Metropolitan City, Republic of Korea.

"Notification Concerning Transmittal of International Preliminary Report on Patentability (Chapter I of the Patent Cooperation Treaty" for PCT/US2013/055702, Mar. 5, 2015, 7 pages, The International Bureau of WIPO, Geneva, Switzerland.

*Primary Examiner* — Rong Le
(74) *Attorney, Agent, or Firm* — Kurt Rauschenbach; Rauschenbach Patent Law Group, LLC

(57) ABSTRACT

A cable television (CATV) optical transmitter includes a tunable laser having a phase bias input and a gain bias input. The tunable laser generates an optical beam at an output. A semiconductor optical amplifier includes an electrical bias input and an optical input that is optically coupled to the output of the tunable laser. The semiconductor amplifier amplifies the optical beam generated by the tunable laser. An integrated balanced modulator includes an electrical modulation input that receives analog CATV signals and an optical input that is connected to the output of the semiconductor amplifier. A third order pre-distortion circuit includes an output that is electrically connected to a modulation input of the integrated balanced modulator. The $3^{rd}$ order pre-distortion circuit generates a signal that, when combined with the analog CATV modulation signal, at least partially cancels third order distortions that are introduced during modulation.

25 Claims, 2 Drawing Sheets

INTEGRATED LASER AND MODULATOR TRANSMITTER FOR CATV APPLICATIONS

CROSS REFERENCE TO RELATED APPLICATION SECTION

The present application claims priority to U.S. Provisional Patent Application No. 61/692,693, filed on Aug. 23, 2012, entitled "Integrated Laser and Modulator Transmitter for CATV Applications." The entire contents U.S. Provisional Patent Application No. 61/692,693 is herein incorporated by reference.

The section headings used herein are for organizational purposes only and should not to be construed as limiting the subject matter described in the present application in any way.

INTRODUCTION

Coaxial Cable Television (CATV) systems are widely deployed today with extensive and complex networks throughout the world. Typical analog CATV optical transmitters are constructed as single modules or circuit boards. Each transmitter module typically includes a single wavelength laser, which provides a single channel transmitter. Multiple channels are provided in a head-end unit. Some CATV systems have as many as 40 or more head-end units. Cable operators typically stock an extra board for each channel so that it can rapidly replace a failed transmitter board when it becomes defective. Other transmitter boards are often stocked to change the transmission frequency.

Prior art transmitter boards are relatively expensive and are physically large. Many prior art transmitter board are expensive because they are custom built and tested for particular transmission frequencies. Recently, small form factor pluggable optical CATV transmitters have been described that are much more compact then prior art CATV transmitter boards. These small form factor transmitter boards can be easily replaced and are generally more cost effective. These transmitter boards are more cost effective for CATV providers to stock in inventory because they are physically smaller and less expensive.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. In the drawings, like reference characters generally refer to like features and structural elements throughout the various figures. The drawings are not intended to limit the scope of the Applicants' teaching in any way.

DESCRIPTION OF VARIOUS EMBODIMENTS

Figure 1:
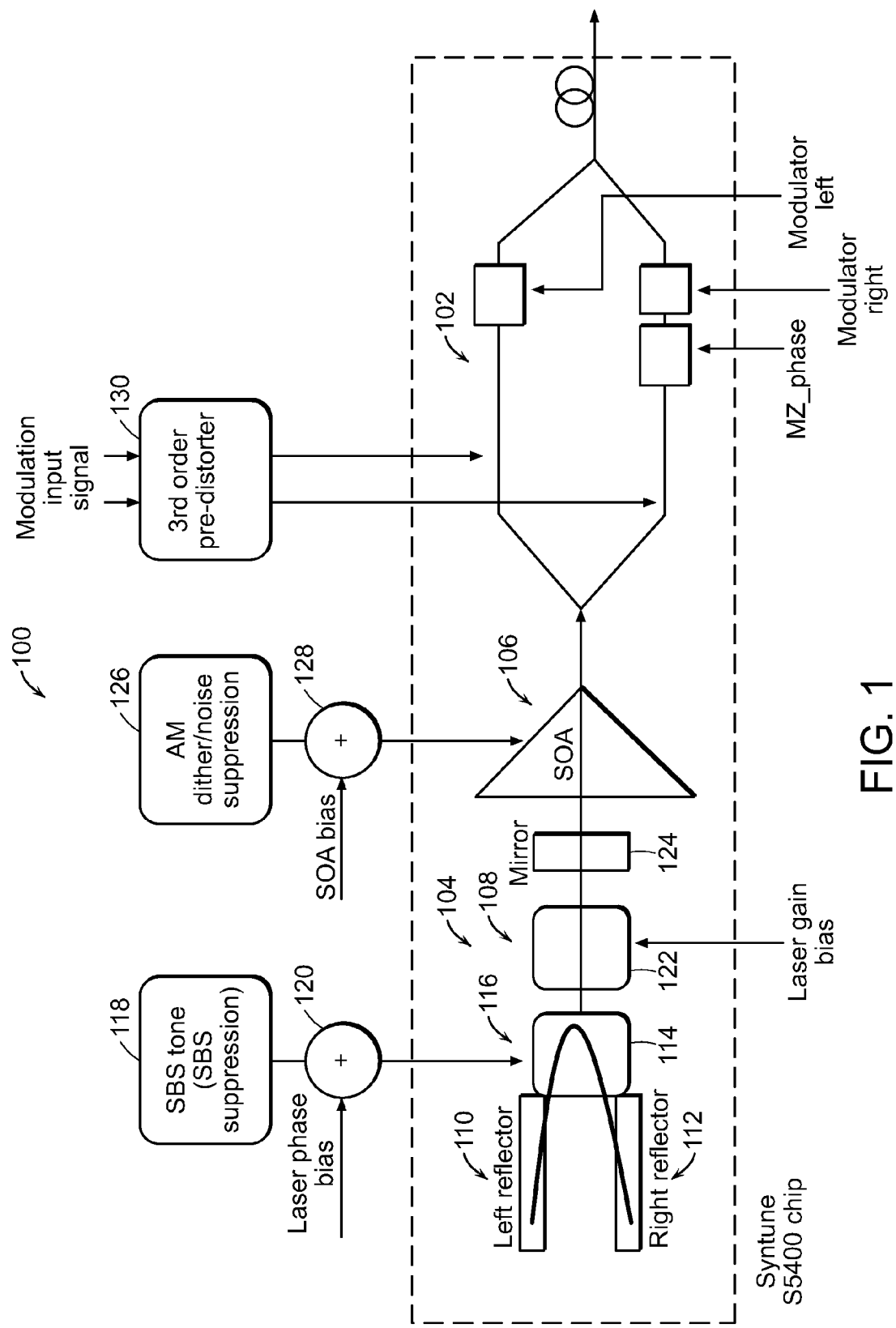
FIG. 1 illustrates a tunable CATV transmitter that includes a tunable InP modulator according the present teaching.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The present teaching relates to methods and apparatus for implementing a tunable Indium Phosphide (InP) modulator for CATV applications. Indium Phosphide is a binary III-V semiconductor composed of indium and phosphorus. It has a crystal structure that is identical to that of GaAs and most other III-V semiconductors. Indium Phosphide is particularly useful for optoelectronic devices because it has a direct bandgap and relatively high electron velocity.

Prior art CATV transmitters are typically single wavelength transmitters that use external modulation. Some prior art CATV transmitters use external Mach-Zehnder type interferometric modulators, such as external lithium niobate Mach-Zehnder modulators. Other prior art CATV transmitters use externally modulated lasers (EMLs). These prior art CATV transmitters that use external modulators typically include a phase modulator in combination with the external modulator in order to reduce Stimulated Brillouin Scattering (SBS). A SBS suppression signal is applied to an input of the phase modulator in order to reduce Stimulated Brillouin Scattering. These prior art CATV transmitters are not very flexible because they are single fixed frequency transmitters. Also, these prior art CATV transmitters cannot easily be integrated into a small foot print or a small form factor. In addition, these prior art CATV transmitters that use external modulators are significantly less efficient than integrated modulators.

Some of the aspects of the present teaching are described in connection with a monolithically integrated InP laser/modulator combination. However, it should be understood that the present teaching relates to both discrete InP modulators and to monolithically integrated InP modulators that integrate the InP modulator with a laser and/or a semiconductor optical amplifier. In addition, it should be understood that the present teaching is not limited to integrated InP modulators. Numerous other types of modulators can be used with the CATV of the present teaching.

FIG. 1 illustrates a tunable CATV transmitter 100 that includes a tunable modulator 102 according the present teaching. The CATV transmitter 100 includes a monolithically integrated semiconductor laser 104, semiconductor optical amplifier 106, and the InP modulator 102. One suitable monolithically integrated device that can be used in a CATV transmitter, according to the present teaching, is the Syntune S5400, which is commercially available from the Finisar Corporation.

The laser 104 shown in FIG. 1 is a semiconductor laser. In one specific embodiment, the laser 104 is an integrated modulated grating Y-branch laser that includes a laser cavity 108 with a left reflector 110 and right reflector 112 on one end of the laser cavity 108. The left and right reflectors 110, 112 create multiple reflection peaks on one side of the laser cavity 108. The reflections from the left and right reflectors 110, 112 are added by using a splitter/combiner 114. In one embodiment, the splitter/combiner 114 is a multi-mode image (MMI) combiner. The splitter/combiner 114 includes a laser phase bias input 116.

In some embodiments, a SBS suppression tone generator 118 is used to inject a SBS suppression tone into the laser phase bias signal. The SBS suppression tone generator 118 has an output that is electrically connected to the laser phase bias input of the splitter/combiner 114 by way of a combiner 120. The SBS signal generator 118 generates a suppression tone or signal that is used to reduce, minimize or cancel SBS in the modulated optical signal that is generated during modulation. The ability to apply a SBS suppression signal to the bias input of the laser has numerous advantages over prior art CATV transmitters. One advantage is that applying a SBS suppression signal to the bias input of an integrated laser before the semiconductor amplifier 106 will more completely cancel the Stimulated Brillouin Scattering. Another advantage is that a separate phase modulator used to suppress SBS in prior art transmitters is no longer necessary, which reduces the number of components that need to be used in the transmitter and reduces the amount of power necessary to operate the transmitter. This is important because many transmitters are designed to be in a small form factor and have limited power budgets. Thus, one aspect of the present teaching is that the tunable InP modulator can implement SBS suppression within the InP modulator itself, without the use of a separate phase modulator.

The laser 104 also includes a gain medium 122 having a laser gain bias input that biases the gain medium 122 to provide optical gain. The laser 104 also includes a front mirror 124 at the other end of the laser cavity 108. The front mirror 124 is partially transmissive and partially reflective. In one embodiment, the front mirror 124 is an integrated Bragg reflector. The front mirror 124 can have a reflectivity that is optimized to achieve high optical output power. In some integrated lasers according to the present teaching, the reflectivity of the front mirror 124 is optimized to achieve an output power with a less than 2 dB variation over the entire tuning range.

The semiconductor optical amplifier 106 has an input that is optically coupled to the output of the partially reflective and partially transmissive front mirror 124 of the laser 104. The semiconductor amplifier 106 has a bias input that is used to receive a bias input signal, which biases the semiconductor optical amplifier 106 so that it provides optical gain. In some embodiments, an Amplitude Modulated (AM) dither/noise suppression generator 126 is used to inject an AM suppression tone or signal into the semiconductor optical amplifier 106 bias input port to reduce, or to effectively eliminate, AM noise in the modulated optical signal. The AM dither/noise suppression generator 126 includes an output that is electrically coupled to the bias input of the semiconductor amplifier 106 with summation circuit 128. The AM dither/noise suppression generator 126 generates a dither noise/suppression signal that reduces AM noise in the modulated optical signal that is generated during modulation.

The InP modulator 102 is an integrated Mach-Zehnder type optical modulator that includes dual or balanced modulation inputs. The balanced configuration provides significant common mode noise suppression. A first modulation input receives a first modulation signal and a second modulation input receives a second modulation signal. For example, the InP modulator 102 can be an integrated 10 Gb/s Mach-Zehnder modulator. Such devices have relatively low drive voltages (about 2.5V). Various embodiments can include either a zero or a negative chirp modulator. In addition, the InP modulator 102 includes a phase modulation input.

Mach-Zehnder type interferometric modulators exhibit a transfer characteristic similar to a raised cosine function. When these Mach-Zehnder integrated modulators are biased at quadrature, the second order distortions are minimized, and thus do not significantly affect the modulated optical signal. However, the third order distortions are significant and need to be reduced in order for the CATV transmitter to meet state-of-the-art operating specifications. These third order distortions can be easily reduced, minimized, or eliminated by using a third order pre-distortion circuit 130 to process the first and second modulation signals. The third order pre-distortion circuit 130 is used to pre-distort the first and second modulation signals before they are applied to the first and second modulation inputs to reduce or effectively cancel the distortions to a level usable for CATV signals. Numerous types of predistortion circuits can be used with the CATV transmitter according to the present teaching. In some embodiments, the predistortion circuit 130 includes an integrated electronic amplifier that is used to amplify the modulation signals. In other embodiments, a separate electronic amplifier amplifies the modulation signals.

In various applications, the tunable InP modulator according to the present teaching can operate over various bands. For example, tunable InP modulators, according to the present teachings, can be tuned over a portion of, or the full, C band (89 channels at 50 GHz spacing). Tunable InP modulators, according to the present teachings, can also provide tuning over the L band.

Thus, the integrated tunable InP modulator for CATV, according to the present teaching, has numerous advantages over the prior art. One advantage is that Stimulated Brillouin Scattering is relatively low compared with prior art CATV modulates and, therefore, predistortion can be more easily achieved. Prior art CATV transmitters, which use external modulation, typically require two high-power and high-frequency SBS suppression tones that are used to suppress Stimulated Brillouin Scattering. In contrast, the integrated tunable InP modulator for CATV, according to the present teaching, can suppress Stimulated Brillouin Scattering to the same levels as prior art CATV transmitters by using a single frequency tone with a relatively low power level. Another advantage of the integrated tunable InP modulator for CATV is that tones can easily be added to the semiconductor amplifier 106 to suppress AM noise.

Figure 2:
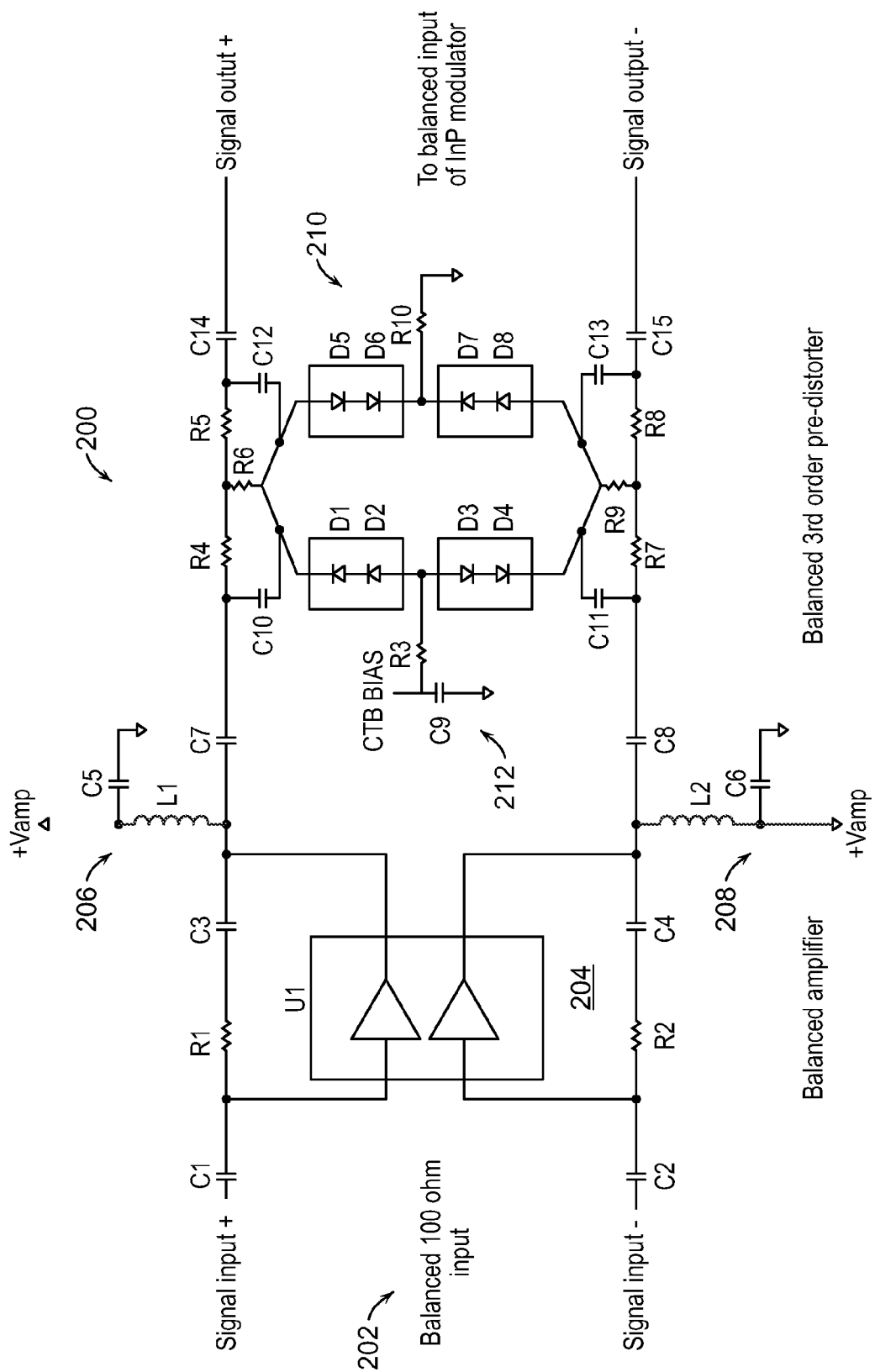
FIG. 2 illustrates one embodiment of an amplifier/predistortion circuit for the tunable CAVT transmitter of the present teaching.

FIG. 2 illustrates one embodiment of an amplifier/predistortion circuit 200 for the tunable CAVT transmitter of the present teaching. The input of the predistortion circuit 200 includes a balanced signal input 202. In one embodiment, the balanced signal input 202 is a balanced 100 ohm feed through to an XFP form factor edge connector. A balanced RF amplifier 204 is electrically connected to the balanced signal input 202. The balanced RF amplifier 204 includes various electronic components, such as AC coupling capacitors C1 and C2 and feedback electronic components R1, C3 and R2, C4. Direct Current (DC) bias circuits 206, 208 are electrically connected to each of the outputs of the balanced RF amplifier 204. The DC bias circuits 206, 208 include inductors L1 and L2 and capacitors C5 and C6.

A balanced third-order pre-distortion circuit 210 is electronically coupled to the balanced RF amplifier 204 by coupling capacitors C7 and C8. Numerous types of balanced predistortion circuits known in the art can be used. In the embodiment shown in FIG. 2, the balanced third-order pre-distortion circuit 210 includes diodes D1-D8 and a resistive network, including resistors R4-R6 and R7-R9. Capacitors C10, C14 provide delay compensation. These are typically called "speed-up" capacitors. A bias circuit 212 is used to control the pre-distorted third order levels that are applied through R3 and R10. This bias adjustment is used to adjust the levels needed to cancel the distortions generated in the modulator. One skilled in the art will appreciate that numerous other types of predistortion circuits can be used.

EQUIVALENTS

While the applicants' teaching is described in conjunction with various embodiments, it is not intended that the applicants' teaching be limited to such embodiments. On the contrary, the applicants' teaching encompass various alternatives, modifications, and equivalents, as will be appreciated by those of skill in the art, which may be made therein without departing from the spirit and scope of the teaching.

What is claimed is:

1. A cable television (CATV) optical transmitter, the optical transmitter comprising:
    a) a tunable laser having a phase bias input and a gain bias input, the tunable laser generating an optical carrier beam at an output;
    b) a semiconductor optical amplifier having a bias input and an optical input that is optically coupled to the output of the tunable laser, the semiconductor optical amplifier amplifying the optical carrier beam generated by the tunable laser;
    c) an integrated balanced modulator having an optical input that is connected to output of the semiconductor optical amplifier and an electrical modulation input that receives analog CATV signals; and
    d) a $3^{rd}$ order pre-distortion circuit having an output that is electrically connected to a modulation input of the integrated balanced modulator, the $3^{rd}$ order pre-distortion circuit generating a signal that, when combined with the analog CATV modulation signal, at least partially cancels third order distortions that are introduced during modulation, the integrated balanced modulator generating a modulated CATV with reduced $3^{rd}$ order distortion.

2. The CATV optical transmitter of claim 1 wherein the tunable laser comprises a modulated grating Y Branch tunable laser comprising a multi-mode image (MMI) combiner.

3. The CATV optical transmitter of claim 1 wherein the semiconductor optical amplifier further comprises a dither input for receiving an AM noise suppression signal.

4. The CATV optical transmitter of claim 1 wherein the integrated balanced modulator comprises an integrated InP modulator.

5. The CATV optical transmitter of claim 1 wherein the integrated balanced modulator comprises a Mach-Zehnder interferometric modulator.

6. The CATV optical transmitter of claim 1 wherein the integrated balanced modulator comprises a modulator that exhibits a raised cosine transfer characteristic.

7. The CATV optical transmitter of claim 1 wherein the integrated balanced modulator comprises a modulator that is biased at quadrature to minimize second order distortions.

8. The CATV optical transmitter of claim 1 wherein the $3^{rd}$ order pre-distortion circuit generates a signal that when combined with the analog CATV signal substantially cancels all third order distortions.

9. The CATV optical transmitter of claim 1 wherein the $3^{rd}$ order pre-distortion circuit comprises a diode network.

10. The CATV optical transmitter of claim 1 wherein the CATV optical transmitter is tunable over the C-band range.

11. The CATV optical transmitter of claim 1 wherein the CATV optical transmitter is tunable over the L-band range.

12. The CATV optical transmitter of claim 1 wherein the analog CATV signal comprises 40 channels with a 100 GHz channel spacing.

13. The CATV optical transmitter of claim 1 wherein the analog CATV signal comprises 80 channels with a 50 GHz channel spacing.

14. The CATV optical transmitter of claim 1 further comprising a radio frequency (RF) amplifier having an input that receives the analog CATV signal and an output that is electrically connected to the electrical input of the integrated balanced modulator, the RF amplifier amplifying the CATV signals before modulation.

15. The CATV optical transmitter of claim 1 further comprising a diagnostic circuit that provides information on at least one of operating temperature, laser bias current, transmitted optical power, received optical power, power supply voltages and thermoelectric cooler temperature.

16. The CATV optical transmitter of claim 15 further comprising a diagnostics transceiver controller that receives data from the diagnostic circuit.

17. A method of transmitting an optically modulated cable television (CATV) signal, the method comprising:
    a) generating a tunable optical carrier beam with a tunable laser having an electrical bias input;
    b) applying a Stimulated Brillouin Scattering (SBS) suppression signal to the laser phase bias input of the tunable laser;
    c) receiving an analog CATV signal;
    d) combining the analog CATV signal with a predistortion signal that at least partially cancels third order distortions that are introduced during optical modulation; and
    e) modulating the processed analog CATV signal on the optical carrier to generate an optically modulated CATV signal.

18. The method of claim 17 further comprising amplifying the received analog CATV signal with an RF amplifier.

19. The method of claim 17 further comprising amplifying the optical carrier beam before modulation with an optical amplifier.

20. The method of claim 19 further comprising applying an AM noise suppression tone to a bias signal of the optical amplifier.

21. The method of claim 17 wherein the combining the analog CATV signal with a predistortion signal substantially cancels all the third order distortions that are introduced during modulation.

22. The method of claim 17 further comprising tuning a frequency of the optical carrier beam.

23. The method of claim 17 wherein a frequency of the optically modulated optical CATV signal is tunable over the C-band range.

24. The method of claim 17 wherein the analog CATV signal comprises 40 channels with a 100 GHz channel spacing.

25. The method of claim 17 wherein the analog CATV signal comprises 80 channels with a 50 GHz channel spacing.

* * * * *